US012633524B2

(12) United States Patent
Touma et al.

(10) Patent No.: US 12,633,524 B2
(45) Date of Patent: May 19, 2026

(54) POSITIVE ELECTRODE ACTIVE MATERIAL FOR ALL-SOLID-STATE LITHIUM ION SECONDARY BATTERY, METHOD FOR PRODUCING THE SAME, AND ALL-SOLID-STATE LITHIUM ION SECONDARY BATTERY

(71) Applicant: SUMITOMO METAL MINING CO., LTD., Tokyo (JP)

(72) Inventors: Mikako Touma, Niihama (JP); Ryousuke Okamoto, Niihama (JP); Kazuhide Hayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 884 days.

(21) Appl. No.: 17/788,857

(22) PCT Filed: Dec. 24, 2020

(86) PCT No.: PCT/JP2020/048554
§ 371 (c)(1),
(2) Date: Jun. 24, 2022

(87) PCT Pub. No.: WO2021/132512
PCT Pub. Date: Jul. 1, 2021

(65) Prior Publication Data
US 2023/0037673 A1 Feb. 9, 2023

(30) Foreign Application Priority Data
Dec. 25, 2019 (JP) ................................ 2019-235267

(51) Int. Cl.
*H01M 4/36* (2006.01)
*C01G 53/00* (2025.01)
(Continued)

(52) U.S. Cl.
CPC ............ *H01M 4/366* (2013.01); *C01G 53/42* (2013.01); *H01M 4/525* (2013.01); (Continued)

(58) Field of Classification Search
CPC ........ H01M 4/36; H01M 4/366; H01M 4/525; H01M 10/0525; C01G 53/00; C01G 53/42
(Continued)

(56) References Cited

U.S. PATENT DOCUMENTS

2015/0214572 A1 7/2015 Kato et al.

FOREIGN PATENT DOCUMENTS

JP 2010-170715 A 8/2010
JP 2014-056661 A 3/2014
(Continued)

OTHER PUBLICATIONS

Machine translation of JP 2016009614 A (Year: 2016).*
(Continued)

*Primary Examiner* — Kevin P Kerns
(74) *Attorney, Agent, or Firm* — WHDA, LLP

(57) ABSTRACT
A positive electrode active material for an all-solid-state lithium ion secondary battery, containing: a lithium-metal composite oxide particle having a niobium solid solution layer and a center other than the niobium solid solution layer; and a coating layer coating at least a part of a surface of the lithium-metal composite oxide particle and formed of a compound containing lithium and niobium, an average thickness of the coating layer is 2 nm or more and 1 μm or less, and an average thickness of the niobium solid solution layer is 0.5 nm or more and 20 nm or less.

6 Claims, 5 Drawing Sheets

(51) Int. Cl.
    *C01G 53/42*         (2025.01)
    *H01M 4/525*        (2010.01)
    *H01M 10/0525*     (2010.01)
    *H01M 4/02*         (2006.01)

(52) U.S. Cl.
    CPC ..... *H01M 10/0525* (2013.01); *C01P 2004/04*
        (2013.01); *C01P 2004/61* (2013.01); *H01M*
           *2004/021* (2013.01); *H01M 2004/028*
                               (2013.01)

(58) Field of Classification Search
    USPC ............................................... 429/218.1, 223
    See application file for complete search history.

(56)              References Cited

FOREIGN PATENT DOCUMENTS

| | | | | | |
|---|---|---|---|---|---|
| JP | 2016009614 A | * | 1/2016 | ............ | Y02E 60/10 |
| JP | 2017-098196 A | | 6/2017 | | |

| | | | | | |
|---|---|---|---|---|---|
| JP | 2017-107827 A | | 6/2017 | | |
| JP | 2018-067474 A | | 4/2018 | | |
| JP | 2020-053383 A | | 4/2020 | | |
| WO | WO 2014/034430 A1 | * | 3/2014 | ............ | H01M 4/525 |

OTHER PUBLICATIONS

Machine translation of WO 2014/034430 A1 (Year: 2014).*
International Search Report dated Mar. 16, 2021, issued in counterpart International application No. PCT/JP2020/048554, with English translation. (4 pages).
International Preliminary Report on Patentability (Form PCT/IB/373) issued in counterpart International application No. PCT/JP2020/048554 mailed Jun. 28, 2022 with Form PCT/ISA/237, with English translation. (8 pages).

* cited by examiner

POSITIVE ELECTRODE ACTIVE MATERIAL FOR ALL-SOLID-STATE LITHIUM ION SECONDARY BATTERY, METHOD FOR PRODUCING THE SAME, AND ALL-SOLID-STATE LITHIUM ION SECONDARY BATTERY

TECHNICAL FIELD

The present invention relates to a positive electrode active material for an all-solid-state lithium ion secondary battery, a method for producing the same, and an all-solid-state lithium ion secondary battery.

BACKGROUND ART

In recent years, it is strongly desired to develop small-sized and lightweight secondary batteries having a high energy density in association with the widespread use of electric cars. There is a lithium ion secondary battery as such a secondary battery. Lithium ion secondary batteries are equipped with, for example, a negative electrode, a positive electrode, an electrolyte and the like, and a material capable of de-inserting and inserting lithium is used as an active material used for the negative electrode and the positive electrode.

Currently, in general lithium ion batteries, for example, a lithium-metal composite oxide such as $LiCoO_2$, $LiNiO_2$, or $LiMn_2O_4$ is used as a positive electrode active material, and lithium metal, a lithium alloy, a metal oxide, carbon, or the like is used as a negative electrode active material. As an electrolyte, an electrolyte solution obtained by dissolving a Li salt such as $LiClO_4$ or $LiPF_6$ as a supporting salt in an organic solvent such as ethylene carbonate, dimethyl carbonate or ethyl methyl carbonate is used.

Among the components of the lithium ion battery, in particular, the electrolyte solution is a factor that limits the performance of the battery such as high-speed charging, thermal stability, and life due to chemical characteristics such as heat resistance and potential window. Therefore, research and development are currently actively conducted on an all-solid-state lithium ion secondary battery (hereinafter, also referred to as "all-solid-state battery") in which performance of the battery is improved by using a solid electrolyte instead of the electrolyte solution.

For example, regarding a solid electrolyte used for an all-solid-state battery, Patent Literature 1 proposes a sulfide solid electrolyte having high lithium ion conductivity and suitable for use in an all-solid-state battery. However, when the sulfide solid electrolyte and the positive electrode active material, which is an oxide, come into contact with each other as disclosed in Patent Literature 1, a reaction occurs at an interface between the positive electrode active material and the solid electrolyte during charge and discharge of the secondary battery. As a result, a high resistance phase that inhibits the operation of the secondary battery is generated in some cases.

Further, regarding a positive electrode active material used for an all-solid-state battery, for example, Patent Literature 2 proposes that a coating layer made of $LiNbO_3$ is provided on a surface of a positive electrode active material to suppress generation of a high resistance phase.

CITATION LIST

Patent Literature

Patent Literature 1: JP 2014-056661 A
Patent Literature 2: JP 2010-170715 A

SUMMARY OF INVENTION

Technical Problem

Incidentally, in order to increase the energy density of the lithium ion secondary battery, it is preferable to use a positive electrode active material (high Ni composition positive electrode active material) having a high content of Ni, such as $LiNiO_2$, $LiNi_{0.80}Co_{0.15}Al_{0.05}O_2$, or $LiNi_{0.6}Co_{0.2}Mn_{0.2}O_2$, which has a high charge and discharge capacity among lithium-metal composite oxides.

However, the present inventors have investigated the applicability of the high Ni composition positive electrode active material to the all-solid-state battery, and found that there is a problem that the energy density obtained from these positive electrode active materials is lower than the energy density expected from a lithium ion secondary battery using a conventional electrolyte solution.

The present invention has been made in view of the above problems, and an object of the present invention is to provide a positive electrode active material having high charge and discharge capacity and initial charge and discharge efficiency when a positive electrode active material having a high Ni content is used for a positive electrode of an all-solid-state battery.

Solution to Problem

According to a first aspect of the present invention, there is provided a positive electrode active material for an all-solid-state lithium ion secondary battery including: a lithium-metal composite oxide particle; and a coating layer, wherein the lithium-metal composite oxide particle has a niobium solid solution layer in which niobium is solid-solved in at least a part of a surface layer of the lithium-metal composite oxide particle, and a center other than the niobium solid solution layer, the coating layer coats at least a part of a surface of the lithium-metal composite oxide particle and is formed of a compound containing lithium and niobium, the positive electrode active material contains lithium (Li), nickel (Ni), and optionally cobalt (Co), manganese (Mn), and an element M, and a ratio (molar ratio) of amounts of elements other than niobium in the positive electrode active material is represented by Li:Ni:Co:Mn:M=s:(1-x-y-z):x:y:z where $0 \le x \le 0.35$, $0 \le y \le 0.35$, $0 \le z \le 0.10$, $0.95 < s < 1.30$, and M is at least one element selected from the group consisting of V, Mg, Mo, Nb, Ti, W, Zr, and Al, an average thickness of the coating layer is 2 nm or more and 1 μm or less, and an average thickness of the niobium solid solution layer is 0.5 nm or more and 20 nm or less.

The compound containing lithium and niobium preferably contains lithium niobate. The compound containing lithium and niobium preferably contains at least one of $Li_3NbO_4$, $LiNbO_3$, $LiNb_3O_8$, and $Li_8Nb_2O_9$. The compound containing lithium and niobium is preferably amorphous. The content of niobium in the positive electrode active material is preferably 0.2 mol % or more and 2.0 mol % or less based on the total of Ni, Co, Mn, and the element M in the lithium-metal composite oxide particle.

According to a second aspect of the present invention, there is provided a method for producing the positive electrode active material for an all-solid-state lithium ion secondary battery, the method including: attaching a coating liquid containing niobium and lithium to a surface of a lithium-metal composite oxide particle to form a coating layer precursor; and performing a heat treatment on the lithium-metal composite oxide particle on which the coating layer precursor is formed to form a niobium solid solution layer.

The coating liquid is preferably a solution obtained by mixing a sol of niobium oxide with an aqueous lithium hydroxide solution. In addition, it is preferable to attach the coating liquid to the lithium-metal composite oxide particle using a tumbling fluidized bed coating apparatus.

According to a third aspect of the present invention, there is provided an all-solid-state lithium ion secondary battery including: a positive electrode; a negative electrode; and a solid electrolyte, wherein the positive electrode contains the positive electrode active material for a lithium ion secondary battery.

DESCRIPTION OF EMBODIMENTS

Figure 1:
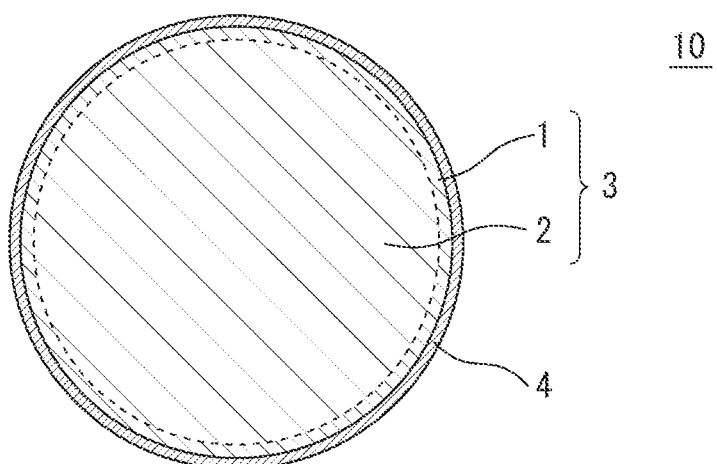
FIG. 1 is a schematic view illustrating an example of a positive electrode active material according to the present embodiment.

Hereinafter, embodiments of the present invention will be described with reference to the drawings. Note that in the drawings, in order to make it easy to understand each configuration, some parts are emphasized or simplified, and actual structures, shapes, scales, and the like may be different from those of the drawings. The present invention is not limited to the following embodiments, and various modifications and substitutions can be made to the following embodiments without departing from the scope of the present invention.

1. Positive Electrode Active Material for all-Solid-State Lithium Ion Battery

The positive electrode active material for an all-solid-state lithium ion secondary battery (hereinafter, also referred to as "positive electrode active material") according to the present embodiment includes a lithium-metal composite oxide particle having a niobium solid solution layer in which niobium is solid-solved in at least a part of a surface layer, and a coating layer made of a compound containing lithium and niobium. The positive electrode active material according to the present embodiment includes a niobium solid solution layer having a specific thickness and a coating layer, whereby the initial discharge capacity (battery capacity) and the initial charge and discharge efficiency in the all-solid-state battery are improved.

FIG. 1 is a view schematically illustrating an example of a positive electrode active material according to the present embodiment. As shown in FIG. 1, a positive electrode active material 10 includes a lithium-metal composite oxide particle 3 having a niobium solid solution layer 1 and a center 2 other than the niobium solid solution layer 1, and a coating layer 4. The lithium-metal composite oxide particle 3 contains at least lithium, nickel, and optionally cobalt, manganese, and an element M. The lithium-metal composite oxide particle 3 may have a layered crystal structure, and niobium is further present in the niobium solid solution layer 1 present in the surface layer. The coating layer 4 is formed of a compound containing lithium and niobium (hereinafter, also referred to as "LiNb compound"). Hereinafter, each element constituting the positive electrode active material 10 will be described.

[Niobium Solid Solution Layer]

The niobium solid solution layer 1 is present on at least a part of the surface layer of the lithium-metal composite oxide particle 3 (site from the outermost surface of the particle to the inside of the particle). When the lithium-metal composite oxide particle 3 is composed of, for example, a secondary particle with a plurality of aggregated primary particles, niobium may be solid-solved in the surface layer of the secondary particle, and when the lithium-metal composite oxide particle 3 is composed of a single primary particle, niobium may be solid-solved in the surface layer of the primary particle.

The niobium solid solution layer 1 refers to a site where the presence of niobium (Nb) is confirmed in the surface layer (inside the surface) of the lithium-metal composite oxide particle 3. The presence of niobium (Nb) can be confirmed, for example, by an energy dispersive X-ray spectroscopy (EDS), mounted on a scanning transmission electron microscope (STEM) (see, FIG. 4).

(Average Thickness of Niobium Solid Solution Layer)

The average thickness of the niobium solid solution layer 1 is preferably 0.5 nm or more and 20 nm or less, and from the viewpoint of improving battery characteristics, the average thickness is more preferably 1 nm or more and 20 nm or less, and may be 1 nm or more and 15 nm or less, 1 nm or more and 10 nm or less, or 1 nm or more and 5 nm or less. The average thickness of the niobium solid solution layer 1 can be confirmed, for example, by performing STEM-EDS surface analysis and line analysis on the surface of the positive electrode active material. When the thickness of the niobium solid solution layer 1 varies depending on the measurement site, the average thickness of the niobium solid solution layer 1 refers to an average value when a plurality of sites are measured. The average thickness of the niobium solid solution layer may be 3 nm or less, or 2 nm or less.

As shown in FIG. 1, the niobium solid solution layer 1 may be formed on the entire surface layer of the lithium-metal composite oxide particle 3, or may be partially (for example, island-like) formed on a part of the surface layer, but is preferably formed uniformly on the entire surface. In addition, there may be a concentration gradient in the concentration of Nb from the surface (outermost layer) to the inside of the lithium-metal composite oxide particle 3.

[Center]

The center 2 refers to a site other than the niobium solid solution layer 1 in the lithium-metal composite oxide particle 3. The center 2 has, for example, the same composition and particle structure as the lithium-metal composite oxide particle (base material 13) used as a base material in a production method described later (see, FIGS. 3(A) to 3(C). The base material is obtained by, for example, firing a nickel composite hydroxide or a nickel composite oxide obtained by oxidation roasting of a nickel composite hydroxide, and a lithium compound.

The composition of the lithium-metal composite oxide particle 3 including the center 2 excluding niobium is represented by, for example, the general formula:$Li_s Ni_{1-x-y-z}C_x Mn_y M_z O_{2+\alpha}$ (where $0 \leq x \leq 0.35$, $0 \leq y \leq 0.35$, $0 \leq z \leq 0.10$, $0.95 < s < 1.30$, $0 \leq \alpha \leq 0.2$, and M is at least one element selected from the group consisting of V, Mg, Mo, Nb, Ti, W, Zr, and Al), similarly to the base material 13. The lithium-metal composite oxide particle 3 preferably has a layered crystal structure. The center 2 may also have a uniform composition.

[Coating Layer]

The coating layer 4 is a layer that coats at least a part of the surface of the lithium-metal composite oxide particle 3 described above. The coating layer 4 is formed of a compound containing lithium and niobium (hereinafter, also referred to as "LiNb compound").

The LiNb compound is a compound containing a Li atom and a Nb atom, and preferably contains lithium niobate. The lithium niobate preferably contains, for example, at least one of $Li_3 NbO_4$, $LiNbO_3$, $LiNb_3 O_8$, and $Li_8 Nb_2 O_9$.

The LiNb compound may be amorphous or may have a crystal structure. When the LiNb compound is amorphous, lithium ion conductivity is improved, so that the positive electrode resistance in the secondary battery can be reduced.

Further, the coating layer 4 may be formed on the entire surface of the lithium-metal composite oxide particle 3 in contact with the electrolyte solution, or may be partially formed on the surface of the primary particle. The coating layer 4 is preferably formed on the entire surface of the lithium-metal composite oxide particle 3. When the lithium-metal composite oxide particle 3 is composed of a secondary particle, the LiNb compound may be formed on the surface of the primary particle exposed on the surface of the secondary particle, or may also be formed on the surface of the primary particle inside the secondary particle.

The presence and type of the LiNb compound constituting the coating layer 4 can be confirmed by, for example, X-ray photoelectron spectroscopy (XPS) or the like. In addition, the presence and type of the LiNb compound constituting the coating layer 4 can be confirmed by, for example, an energy dispersive X-ray spectroscopy (EDS) mounted on a scanning transmission electron microscope (STEM). In addition, the crystallinity of the LiNb compound can be confirmed by XRD measurement.

(Average Thickness of Coating Layer)

The average thickness of the coating layer 4 is 2 nm or more and 1 µm or less. From the viewpoint of further improving the battery characteristics, the average thickness of the coating layer 4 is more preferably 2 nm or more and 100 nm or less, and may be 2 nm or more and 50 nm or less, 2 nm or more and 20 nm or less, or 5 nm or more and 10 nm or less. The average thickness of the coating layer 4 can be confirmed, for example, by performing STEM-EDS surface analysis and line analysis on the surface of the positive electrode active material. When, the thickness of the coating layer 4 varies depending on the measurement site, the average thickness of the coating layer 4 refers to an average value when a plurality of sites are measured.

As shown in FIG. 1, the coating layer 4 may be formed on the entire surface of the lithium-metal composite oxide particle 3, or may be formed partially (for example, island-like) on a part of the surface, but is preferably formed uniformly on the entire surface. The ratio of the average thickness of the niobium solid solution layer to the average thickness of the coating layer (average thickness of niobium solid solution layer/average thickness of coating layer) is not particularly limited, but may be 0.1 or more, preferably more than 0.1, more preferably 0.15 or more, and still more preferably 0.2 or more.

[Positive Electrode Active Material]

The positive electrode active material 10 includes the lithium-nickel composite oxide particle 3 having the niobium solid solution layer 1 on the surface layer, and the coating layer 4. Hereinafter, characteristics of the positive electrode active material 10 will be described.

(Composition)

The positive electrode active material 10 contains at least lithium (Li), nickel (Ni), and optional cobalt (Co), manganese (Mn), and an element M. The ratio (molar ratio) of amounts of elements other than niobium in the entire positive electrode active material is represented by $Li:Ni:Co:Mn:M=s:(1-x-y-z):x:y:z$ (where $0 \leq x \leq 0.35$, $0 \leq y \leq 0.35$, $0 \leq z \leq 0.10$, $0.95 < s < 1.30$, and M is at least one element selected from the group consisting of V, Mg, Mo, Nb, Ti, W, Zr, and Al.). The composition of the positive electrode active material 10 can be a known composition of the lithium-metal composite oxide as long as the above-described amount ratio is satisfied, and can be appropriately selected according to the characteristics required for the secondary battery.

In the molar ratio, s indicating the Li content is more than 0.95 and less than 1.30, and may be 1.0 or more and 1.10 or less, or more than 1.0 and 1.10 or less. When the value of s is too small, a site to be occupied by lithium in the crystals of the lithium-metal composite oxide particle is occupied by other elements, and the charge and discharge capacity in the secondary battery may be reduced. On the other hand, when the value of s is 1.3 or more, an excessive lithium compound that does not contribute to charge and discharge exists, which may increase the positive electrode resistance (reaction resistance) or may decrease the battery capacity.

In the molar ratio, (1-x-y-z) indicating the content of nickel (Ni) is 0.2 or more and 1.0 or less, and may be 0.3 or more and 1.0 or less. In addition, from the viewpoint of battery capacity, (1-x-y-z) is preferably 0.55 or more, more preferably 0.6 or more, and still more preferably 0.8 or more. When the content of nickel represented by (1-x-y) is more than 0.55, a high battery capacity can be obtained.

In the above molar ratio, x indicating the content of cobalt (Co) may be $0 \leq x \leq 0.35$, $0.05 \leq x \leq 0.35$, or $0.1 \leq x \leq 0$. When cobalt is contained in the above range, the battery has a high battery capacity and excellent cycle characteristics.

In the above molar ratio, y indicating the content of manganese (Mn) may satisfy $0 \leq y \leq 0.35$ and $0 \leq y \leq 0.10$. When manganese is contained in the above range, thermal stability is excellent.

In the molar ratio, z indicating the content of the element M is, for example, $0 \leq z \leq 0.10$. M can be selected from a plurality of elements according to required characteristics. M preferably contains Al. When M contains Al, the content of Al in the molar ratio is z1, and the content of M other than Al in the molar ratio is z2, (where z1+z2=z), the value of z1 is preferably 0.01 or more and 0.1 or less. The value of y2 may be 0 or more and 0.1 or less, or may be 0. The positive electrode active material may contain a small amount of elements other than Ni, Co, Mn, and the element M as long as the effect of the present invention is not impaired.

The positive electrode active material 10 may be represented by the general formula:$Li_s Ni_{1-x-y-z}Co_x Mn_y M_z O_{2+\alpha}$ (where $0 \leq x \leq 0.35$, $0 \leq y \leq 0.35$, $0 \leq z \leq 0.10$, $0.95 < s < 1.30$, $0 \leq \alpha \leq 0.2$, and M is at least one element selected from the group consisting of V, Mg, Mb, Mo, Nb, Ti, W, Zr, and Al) as a composition excluding niobium. In the general formula, α is a coefficient that changes according to the valence of a metal element other than lithium contained in the lithium-metal composite oxide and the atomic number ratio of lithium to a metal element other than lithium.

[Content of Niobium]

The content of niobium contained in the positive electrode active material 10 is preferably 0.2 mol % or more and 2.0 mol % or less, and more preferably 0.5 mol % or more and 2.0 mol % or less based on the total of Ni, Co, Mn, and the element M in the lithium-metal composite oxide particle 3. The amount of niobium contained in the LiNb compound is more preferably 0.6 mol % or more and 1.8 mol % or less from the viewpoint of further improving the battery characteristics. The content of niobium in the positive electrode active material 10 corresponds to, for example, the total amount of niobium contained in the niobium solid solution layer 1 and the coating layer 4.

[Volume Average Particle Diameter MV]

The volume average particle diameter MV of the positive electrode active material 10 is, for example, 5 μm or more and 30 μm or less, and preferably 5 μm or more and 20 μm or less. When the volume average particle diameter MV is less than 5 μm, the specific surface area of the positive electrode active material increases, so that a high output can be obtained when a secondary battery is formed. Meanwhile, the packing density of the positive electrode decreases, so that the charge and discharge capacity per volume decreases, and the dispersibility of the conductive agent and the positive electrode active material may deteriorate when an electrode paste is prepared. Moreover, when the voltage applied to the individual positive electrode active material particles in the electrode becomes non-uniform, particles to which a high voltage is applied deteriorate with repeated charging and discharging. This results in decrease in charge and discharge capacity of the secondary battery. On the other hand, when the volume average particle diameter MV exceeds 30 μm, the specific surface area of the positive electrode active material decreases, and the interface with the electrolyte solution decreases, so that the number of routes through which lithium ions enter and exit decreases. As a result, the resistance of the positive electrode increases, and the output characteristics of the battery may deteriorate. The volume average particle diameter MV is a value measured by a laser diffraction scattering method.

[Spread of Particle Size Distribution]

[(d90−d10)/volume average particle diameter MV], which is an index indicating the spread of the particle size distribution of the positive electrode active material 10, is not particularly limited, but is preferably 0.70 or more and more preferably 0.70 or more and 1.2 or less from the viewpoint of having high filling properties. By using the method for producing a positive electrode active material described later, even when the spread of the particle size distribution of the positive electrode active material is relatively large, the surface of the lithium-metal composite oxide particle 3 or the base material 13 can be uniformly coated with the coating layer 4 or a coating layer precursor 14 (see, FIGS. 3(B) and 3(C)).

d10 means a particle size at which the accumulated volume is 10% of the total volume of all particles when the number of particles in each particle size is accumulated from the smaller particle size side. d90 means a particle size at which the accumulated volume is 90% of the total volume of all particles when the number of particles in each particle size is accumulated from the smaller particle size side in the same manner. d10 and d90 can be determined from the volume integrated value measured using a laser light diffraction scattering particle size analyzer in the same manner as the average particle size.

[Average Particle Size of Primary Particles]

When the lithium-metal composite oxide particle 3 constituting the positive electrode active material 10 includes a secondary particle composed of a plurality of primary particle, the average particle size of the primary particles is, for example, preferably 0.2 μm or more and 1.0 μm or less, and more preferably 0.3 μm or more and 0.7 μm or less. When the average particle size of the primary particles is in the above range, higher output characteristics, battery capacity, and higher cycle characteristics when used for a positive electrode of a secondary battery can be obtained. When the average particle size of the primary particles is less than 0.2 μm, firing may be insufficient, and sufficient battery performance may not be obtained. When the average particle size of the primary particles exceeds 1.0 μm, high output characteristics and high cycle characteristics may not be obtained.

The lithium-metal composite oxide particle constituting the positive electrode active material 10 may be a secondary particle formed by aggregation of a plurality of primary particles, may be a single primary particle, or may include both of them. The positive electrode active material 10 may contain a lithium-metal composite oxide other than the lithium-metal composite oxide particle 3 described above as long as the effects of the present invention are not impaired.

The method for producing the positive electrode active material is not particularly limited as long as the positive electrode active material having the above characteristics can be obtained, but it is preferable to use a production method described later.

Figure 2:
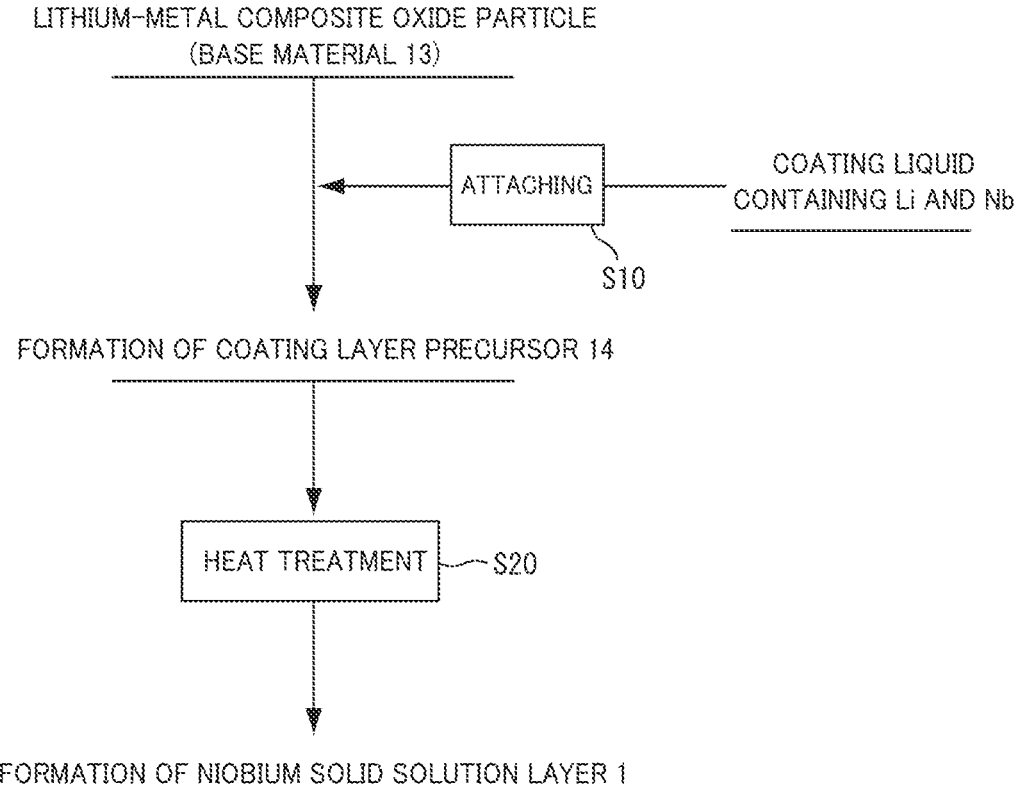
FIG. 2 is a diagram illustrating an example of a method for producing a positive electrode active material according to the present embodiment.
Figure 3A:
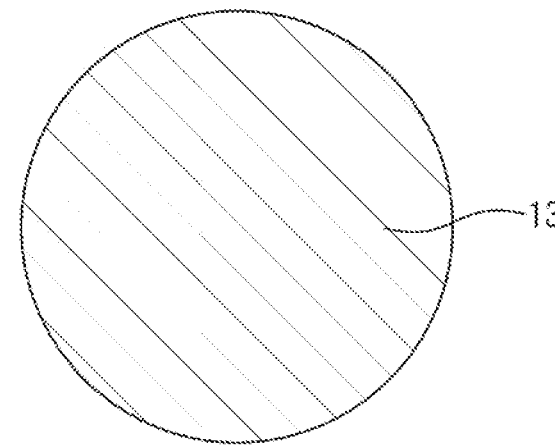
FIGS. 3(A) to 3(C) are schematic views illustrating an example of a method for producing a positive electrode active material according to the present embodiment.
Figure 3B:
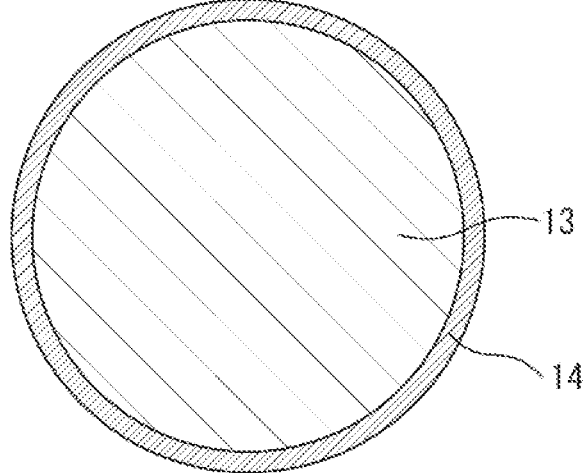
Figure 3C:
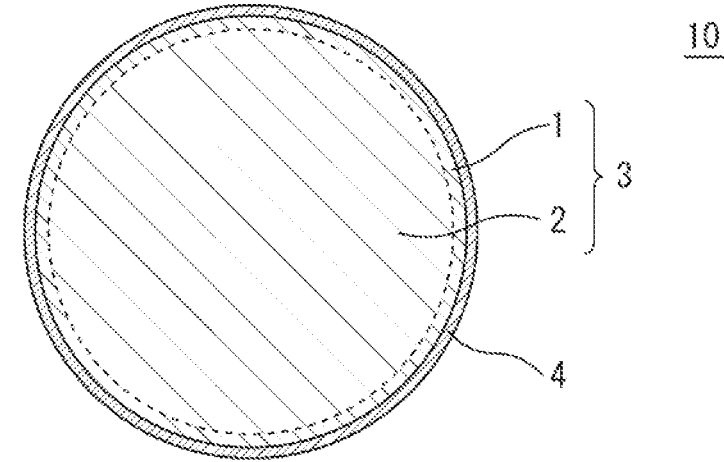

2. Method for Producing Positive Electrode Active Material for Lithium Ion Secondary Battery FIG. 2 is a diagram illustrating an example of a method for producing a positive electrode active material for a lithium ion secondary battery according to the present embodiment (hereinafter, also referred to as "method for producing a positive electrode active material"). FIGS. 3(A) to 3(C) are views schematically illustrating processes of forming the niobium solid solution layer 1 and the coating layer 4. Hereinafter, the method for producing a positive electrode active material according to the present embodiment will be described with reference to FIG. 2 and FIGS. 3(A) to 3(C).

As shown in FIG. 2, the method for producing a positive electrode active material according to the present embodiment includes: attaching a coating liquid containing niobium and lithium to a surface of a lithium-metal composite oxide particle (hereinafter, also referred to as "base material 13") used as the base material 13 to form a coating layer precursor 14 (step S10: attaching process); and performing a heat treatment on the base material 13 on which the coating layer precursor 14 is formed to form the niobium solid solution layer 1 (step S20: heat treatment process). The above-described positive electrode active material 10 can be easily produced with high productivity on an industrial scale by using this method for producing a positive electrode active material. Hereinafter, the respective processes will be described.

[Attaching Process: step S10]

The attaching process (step S10) is a process of attaching a coating liquid containing niobium and lithium to the surface of the base material 13 to form the coating layer precursor 14 (see, FIG. 3(B)). By using a coating liquid containing lithium together with niobium in the attaching process (step S10), the niobium solid solution layer 1 described above can be suitably formed.

(Coating Liquid Containing Niobium and Lithium)

The coating liquid containing niobium and lithium (hereinafter, also referred to as "coating liquid") is a solution containing niobium and lithium, and is not particularly limited as long as it is a solution capable of finally forming lithium and a niobium compound constituting an intended coating layer 4.

The coating liquid can be obtained, for example, by mixing a niobium compound, a lithium compound, and a solvent. In addition, from the viewpoint of uniformly coating the surface of the base material 13, the coating liquid is preferably liquid at normal temperature, and the niobium compound and the lithium compound used as raw materials are preferably compounds having a low melting point, which are melted by heat treatment at a low temperature.

The coating liquid may be prepared, for example, by mixing a niobium compound and a lithium compound in a single solvent. The coating liquid may also be prepared by separately preparing a solution in which a niobium compound is dissolved (hereinafter, also referred to as "niobium solution") and a solution in which a lithium compound is dissolved (hereinafter, also referred to as "lithium solution") and mixing them. In addition, the niobium solution and the lithium solution may be separately sprayed onto the base material 13 to form a coating liquid containing niobium and lithium on the surface of the base material 13. Hereinafter, each material used for the coating liquid will be described.

(Niobium Compound)

The type of the niobium compound used in the coating liquid is not particularly limited, and examples thereof include niobic acid, niobium oxide, niobium nitrate, and niobium pentachloride, and among these, niobium oxide is preferable. The niobium compound may be used alone or in combination of two or more types thereof.

When a niobium solution is prepared, a powder of a niobium compound may be dissolved in an aqueous solution (dispersion medium), or a sol (colloid solution) in which a niobium compound is dispersed may be used. From the viewpoint of improving the dispersibility of niobium, a sol of a niobium compound (colloid solution) is more preferable, and a sol of niobium oxide is particularly preferable.

When a sol of a niobium compound is used as the niobium solution, the dispersion medium is not particularly limited. A known aqueous solution can be used as a dispersion medium, and an aqueous solution containing ammonia is preferable. The niobium compound in the niobium solution may be composed of at least one of a single primary particle and a secondary particle including a plurality of primary particles. The volume average particle diameter MV (secondary particle size) of the niobium compound is not particularly limited, but may be 1 µm or less, 100 nm or less, and preferably 20 nm or less from the viewpoint of improving the dispersibility of the niobium compound. The lower limit of the volume average particle diameter MV (secondary particle size) of the niobium compound is not particularly limited, and may be 5 nm or more or 10 nm or more. The primary particle size of the niobium compound may be 5 nm or less.

For example, when a sol of niobium oxide having a volume average particle diameter MV (secondary particle size) of 20 nm or less is used as a niobium solution, the niobium oxide has very excellent reactivity with lithium because it has a small primary particle size of several nm, which is fine, and is present in a state of being dispersed in a dispersion medium. Thus, the coating layer precursor 14 (finally, the coating layer 4) composed of a LiNb compound can be more uniformly formed on the surface of the lithium-metal composite oxide particle (base material 13) (finally, the lithium-metal composite oxide particle 3).

(Lithium Compound)

The type of the lithium compound used in the coating liquid is not particularly limited, and examples thereof include lithium hydroxide, lithium carbonate, lithium nitrate, and lithium acetate. Among these, lithium hydroxide is preferable from the viewpoint of high reactivity, reduction of impurities, and the like. The lithium compound may be used alone or in combination of two or more types thereof.

The lithium solution may be obtained by dissolving the lithium compound in an aqueous solution (including water), and it is preferable to use an aqueous lithium hydroxide solution. In particular, when lithium is contained in a sol in which niobium is dispersed, it is preferable to mix an aqueous lithium hydroxide solution with the niobium oxide sol.

(Base Material)

The lithium-metal composite oxide particle (base material 13) used as the base material has a hexagonal crystal structure, and contains lithium (Li), nickel (Ni), and optionally cobalt (Co), manganese (Mn), and an element M. In the base material 13, the ratio (molar ratio) of amounts of elements is represented by Li:Ni:Co:Mn:M=s:(1-x-y-z):x:y:z (where $0 \leq x \leq 0.35$, $0 \leq y \leq 0.35$, $0 \leq z \leq 0.10$, $0.95 < s < 1.30$, and M is at least one element selected from the group consisting of V, Mg, Mo, Nb, Ti, W, Zr, and Al). The preferred range of the ratio of amounts of elements is the same as that of the lithium-metal composite oxide particle 3 described above. The base material 13 may or may not contain niobium.

The base material 13 may be represented by, for example, the general formula: $Li_sNi_{1-x-y-z}Co_xMn_yM_zO_{2+\alpha}$ (where $0 \leq x \leq 0.31$, $0 \leq y \leq 0.35$, $0 \leq z \leq 0.10$, $0.95 < s < 1.30$, $0 \leq \alpha \leq 0.2$, and M is at least one element selected from the group consisting of V, Mg, Mo, Nb, Ti, W, Zr, and Al).

The method for producing the base material 13 is not particularly limited. For example, the base material 13 may be obtained by mixing a nickel composite hydroxide obtained by a crystallization method or a nickel composite oxide obtained by roasting the nickel composite hydroxide with a lithium compound and then firing the mixture. As a method for producing a nickel composite hydroxide (precursor), either a batch method or a continuous method can be applied. From the viewpoint of cost and from the viewpoint of obtaining a nickel composite hydroxide having a wider particle size distribution, a continuous method of continuously collecting overflowed nickel composite hydroxide particles from a reaction vessel is more preferable. The base material 13 may include a secondary particle formed by aggregation of a plurality of primary particles, or may include a single primary particle.

(Attaching Method)

Hereinafter, an example of the attaching process (S10) will be described more specifically.

In the attaching process (S310), first, the specific surface area of the base material 13 is measured, and a coating liquid may be prepared according to the target amounts of the constituent elements excluding lithium (niobium) of the niobium solid solution layer 1 and the coating layer 4 per unit area of the surface of the lithium-metal composite oxide particle 3.

The content of niobium in the coating liquid is preferably adjusted so that the content of niobium when the coating liquid is attached to the surface of the base material 13 is 0.2 mol % or more and 2.0 mol % or less, more preferably 0.5 mol % or more and 2.0 mol % or less based on the total of Ni, Co, Mn, and the element M in the lithium-metal composite oxide particle 3, and from the viewpoint of further improving the battery characteristics, more preferably 0.6 mol % or more and 1.8 mol % or less.

In addition, the content of lithium in the coating liquid is adjusted so that the content of lithium when the coating liquid is attached to the surface of the base material 13 is preferably 0.1 mol % or more and 6.0 mol % or less, and more preferably 0.3 mol % or more and 5.4 mol % or less based on the total of Ni, Co, Mn, and the element M in the lithium-metal composite oxide particle 3. Inclusion of lithium in the above range allows uniform formation of the niobium solid solution layer 1 in the heat treatment process (step S20) described later. In addition, the ratio of the amount of lithium (Li) to the amount of niobium (Nb) in the coating liquid is preferably Li:Nb=1:0.5 to 3, and may be 1:0.5 to 1.5.

The base material 13 may contain a lithium compound as excessive lithium, and lithium derived from the excessive lithium in the base material 13 may react with niobium in the coating liquid to form a part of the LiNb compound (coating layer 4). However, when the coating liquid does not contain lithium, it is difficult to stably form the coating layer 4 having a specific thickness and the niobium solid solution layer 1 uniformly.

Subsequently, the coating liquid is attached to the surface of the base material. An apparatus used for the attachment is not particularly limited as long as it is an apparatus in which the surface of the base material 13 is uniformly coated with the coating liquid. For example, both materials may be mixed and attached using a general mixer. From the viewpoint of forming a more uniform coating layer precursor 14, it is preferable to perform the attachment by spraying the coating liquid and the drying of the coating liquid after the attachment in parallel. It is also preferable to perform the attachment by spraying the coating liquid and the drying of the coating liquid after the attachment in parallel using a tumbling fluidized bed coating apparatus.

As described above, the finally obtained coating layer 4 preferably uniformly coats the surface of the lithium-metal composite oxide particle 3 with a specific thickness. When a tumbling fluidized bed coating apparatus is used, a heated flow is generated in the container to bring the base material 13 into a fluidized state. This allows the attachment by spraying of the coating liquid and the drying after the attachment to be performed in parallel. Thus, the coating liquid can be uniformly attached to the surface of the base material 13.

In addition, the coating liquid may cause shrinking by drying, and thus a gap is likely to be generated between the lithium-metal composite oxide particle 3 and the coating layer 4 only by performing one spraying step and one drying step. It is therefore preferable to repeat the attachment of the coating liquid by spraying and the drying after the attachment a plurality of times in parallel. When the tumbling fluidized bed coating apparatus is used, the coating liquid is sprayed onto the base material 13 flowing by the heated flow in the container of the apparatus, whereby the spraying and the drying are automatically repeated. Thus, the coating layer precursor 14 uniformly coating the entire surface of the base material 13 can be obtained.

The drying can be performed at a temperature at which the solvent and the like of the coating agent can be removed. The supplied air temperature in the tumbling fluidized bed coating apparatus may be set to be, for example, 80° C. or higher and lower than 300° C., and may be set to be lower than 200° C. After the attaching process (S10), additional drying may be separately performed using a stationary dryer or the like.

The atmosphere during drying is not particularly limited, but in order to prevent the base material 13 from reacting with moisture in the atmosphere, air supplied from a compressor equipped with a dryer, and an inert atmosphere such as nitrogen or argon gas is preferable.

[Heat Treatment Process (Step S20)]

The heat treatment process (step S20) is a process of performing heat treatment on the lithium-metal composite oxide particle (base material 13) on which the coating layer precursor 14 is formed to form the niobium solid solution layer 1 (step S20). By performing the heat treatment process (step S20) a part of niobium in the coating layer precursor 14 is solid-solved in the base material 13 to form the niobium solid solution layer 1 having a specific thickness (see, FIG. 3(C)), and the bonding between the coating layer 4 and the lithium-metal composite oxide particle 3 can be made firm.

The heat treatment conditions in the heat treatment process (step S20) are not particularly limited as long as the intended niobium solid solution layer 1 can be formed. An example of heat treatment conditions will be described below.

The atmosphere of the heat treatment may be an oxygen atmosphere or an air atmosphere. The oxygen concentration in the oxygen atmosphere is preferably equal to or higher than the oxygen concentration in the air atmosphere, that is, the oxygen concentration is preferably 20 vol % or higher. By setting the oxygen atmosphere during heat treatment to be equal to or higher than the oxygen concentration of the air atmosphere, it is possible to suppress occurrence of oxygen defects in the obtained positive electrode active material 10. Since an oxygen atmosphere can be used, the upper limit of the oxygen concentration in the oxygen atmosphere can be set to 100 vol %.

The temperature of the heat treatment may be 100° C. or higher and 600° C. or lower, or may be 200° C. or higher and 500° C., or lower. In addition, when the heat treatment temperature is 300° C. or higher, the impurities contained in the coating liquid can be particularly suppressed from remaining in the positive electrode active material, which is preferable. When the temperature of the heat treatment is 600° C. or lower, excessive diffusion of the components of the coating layer precursor 14 (for example, lithium and niobium) is suppressed, and the forms of the niobium solid solution layer 1 and the coating layer 4 can be suitably maintained, which is preferable.

The time of the heat treatment is, for example, 1 hour or more and 5 hours or less. When the time of the heat treatment is set to 1 hour or more, it is possible to particularly suppress the impurities contained in the coating liquid from remaining in the positive electrode active material 10. In addition, even when the heat treatment time is longer than 5 hours, a remarkable change is not observed in the obtained positive electrode active material 10. Therefore, the heat treatment time is preferably 5 hours or less from the viewpoint of energy efficiency.

After the heat treatment process (step S20), the heat-treated product is cooled to room temperature to obtain the positive electrode active material 10 as a final product, in which the coating layer 4 is formed on the surface of the lithium-metal composite oxide particle 3 having the niobium solid solution layer 1. When slight sintering is observed in the positive electrode active material 10 obtained after the heat treatment process (step S20), a crushing treatment may be further performed.

3. All-Solid-State Lithium Ion Secondary Battery

The all-solid-state lithium ion secondary battery (hereinafter also referred to as "secondary battery") according to the present embodiment includes a positive electrode, a negative electrode, and a solid electrolyte. The positive electrode contains the positive electrode active material described above. The embodiments described below are merely examples, and the secondary battery can be implemented in various modified and improved forms based on the knowledge of those skilled in the art including the following embodiments. Furthermore, the use of the secondary battery is not particularly limited.

Hereinafter, the secondary battery according to the present embodiment will be described for each component.

<Positive Electrode>

The positive electrode can be formed by molding a positive electrode mixture. The positive electrode is appropriately treated according to the battery to be used. For example, in order to increase the electrode density, a pressure compression treatment by pressing or the like can be performed.

The positive electrode mixture can be formed, for example, by mixing the above-described positive electrode active material in a powder state and a solid electrolyte.

The solid electrolyte is added in order to impart appropriate ionic conductivity to the electrode. The type of the solid electrolyte is not particularly limited, but for example, sulfide solid electrolytes such as $Li_3PS_4$, $Li_7P_3S_{11}$, and $Li_{10}GeP_2S_{12}$, oxide-based solid electrolytes such as $Li_7La_3Zr_2O_{12}$ and $Li_{0.34}La_{0.51}TiO_{2.94}$, and polymer electrolytes such as PEO can be used.

Note that a binding agent, a conductive material, and the like may be added to the positive electrode mixture.

The binding agent plays a role of binding the positive electrode active material. The binding agent used in the positive electrode mixture is not particularly limited. For example, one or more selected from polyvinylidene fluoride (PVDF), polytetrafluoroethylene (PTFE), fluororubber, ethylene propylene diene rubber, styrene butadiene, a cellulose resin, polyacrylic acid, and the like can be used.

The conductive material is added to impart appropriate conductivity to the electrode. The material of the conductive material is not particularly limited, but for example, graphite such as natural graphite, artificial graphite, and expanded graphite, and carbon black-based materials such as acetylene black and KETJEN BLACK IM (registered trademark) can be used.

In addition, the mixing ratio of each substance in the positive electrode mixture is not particularly limited. For example, the content of the positive electrode active material can be set to 50 mass part or more and 90 mass part or less, and the content of the solid electrolyte can be set to 10 mass part or more and 50 mass part or less, based on 100 mass part of the positive electrode mixture.

However, a method for producing the positive electrode is not limited to the above-described exemplified one, and another method may be adopted.

<Negative Electrode>

The negative electrode contains a negative electrode active material, and may be formed by molding a negative electrode mixture in some cases.

The negative electrode mixture may be formed (molded) by substantially the same method as that of the positive electrode described above although constituent components, blending thereof, and the like are different, and various treatments are performed as necessary in the same manner as the positive electrode. The negative electrode mixture can be prepared by mixing a negative electrode active material and a solid electrolyte.

As the negative electrode active material, for example, an insertion material capable of inserting and de-inserting lithium ions or a metal can be adopted.

The insertion material is not particularly limited, but one or more selected from, for example, natural graphite, artificial graphite, a fired product of an organic compound such as a phenol resin, and a powder of a carbon substance such as coke may be used. When the insertion material is adopted as the negative electrode active material, a sulfide solid electrolyte such as $Li_3PS_4$ can be used as the solid electrolyte similarly to the positive electrode.

As the metal (negative electrode active material), for example, a sheet-shaped member made of a substance containing a metal to be alloyed with lithium, such as metal lithium or indium may be used.

<Solid Electrolyte>

The solid electrolyte is a solid having $Li^+$ ion conductivity. As the solid electrolyte, one selected from a sulfide solid electrolyte, an oxide-based solid electrolyte, a polymer electrolyte, and the like can be used alone or in combination of two or more types thereof. As the solid electrolyte, the same material as the solid electrolyte used for the above-described positive electrode can be used.

<Shape and Configuration of Secondary Battery>

The secondary battery according to the present embodiment can have various shapes such as a coin shape and a laminate shape. In any shape, the positive electrode and the negative electrode can be laminated with the solid electrolyte interposed therebetween. Then, the positive electrode collector and the positive electrode terminal connected to the outside and the negative electrode collector and the negative electrode terminal connected to the outside are connected using a current collecting lead or the like, and sealed in a battery case to form a secondary battery.

<Characteristics of Secondary Battery>

The secondary battery according to the present embodiment exhibits a high battery capacity and a high initial charge and discharge efficiency by containing the positive electrode active material in the positive electrode.

Figure 5:
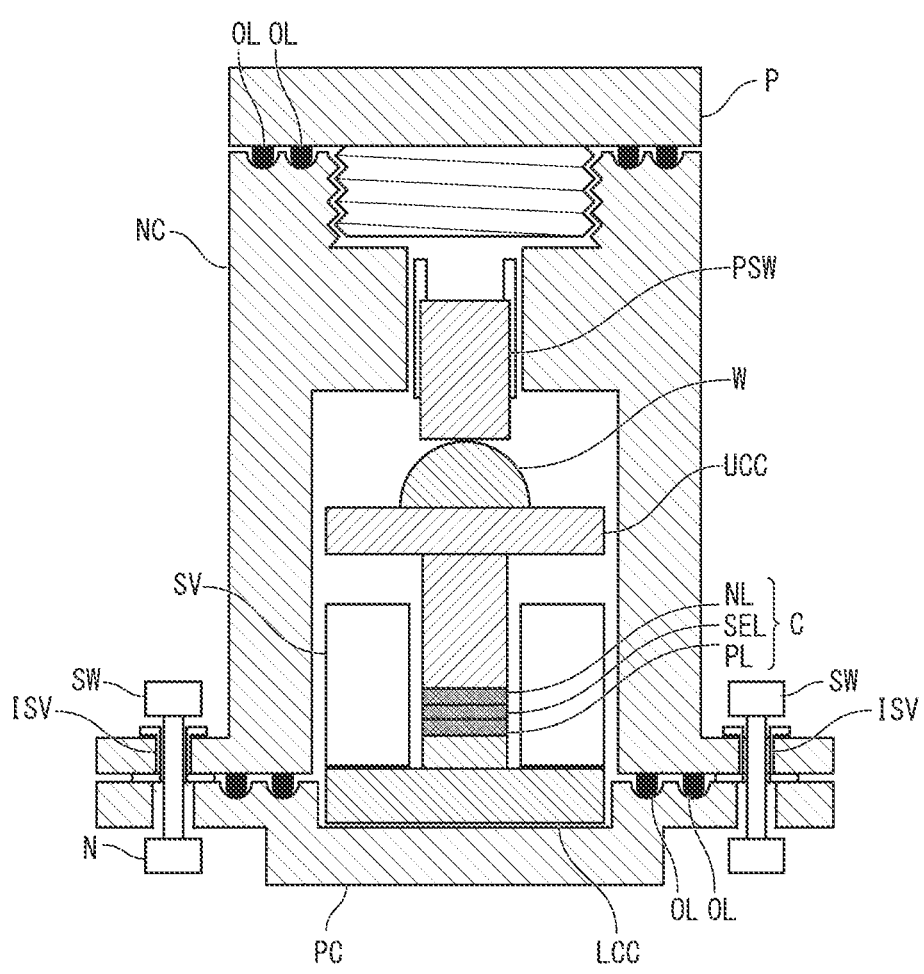
FIG. 5 is an explanatory view of a cross sectional configuration of a test battery used for battery evaluation.

For example, in the test battery shown in FIG. 5 using the positive electrode active material according to the present embodiment as a positive electrode, the initial discharge capacity is preferably 110 mAh/g or more, and more preferably 120 mAh/g or more. In addition, the initial charge and discharge efficiency is preferably 66% or more, and more preferably 68% or more.

The initial discharge capacity refers to a discharge capacity when the test battery shown in FIG. 5 is charged to a cutoff voltage of 4.3 V (vs. Li) at a current density of 0.2 mA/cm2, paused for 1 hour, and then discharged to a cutoff voltage of 2.5 V (vs. Li). The initial charge and discharge capacity refers to a ratio (%) of the discharge capacity to the charge capacity when charging and discharging are performed under the above conditions.

EXAMPLES

Hereinafter, the present invention will be specifically described using Examples of the present invention, but the present invention is not limited by these Examples at all. Note that an analysis method and various evaluation methods for a positive electrode active material in each of Examples and Comparative examples are as follows.

[Composition]

Measurement was performed with an ICP emission spectrometer (725ES, manufactured by Varian Medical Systems, Inc.).

[Volume Average Particle Diameter MV, Particle Size Distribution]

The volume average particle diameter MV, D10, D90, and the like, which are indices of particle size distribution, were measured with a laser diffraction particle size analyzer (product name: Microtrac, manufactured by Nikkiso Co., Ltd.). A particle size distribution width represented by $[(D90-D_{10})/MV]$ was calculated using each measured value.

[Thickness of Coating Layer and Niobium Solid Solution Layer]

The thickness of the coating layer was measured by observing the coated lithium-metal composite oxide sliced with a Cryo Ion Slicer (IB-09060 CIS, manufactured by JEOL Ltd.), using a TEM (JEM-ARM500F, manufactured by JEOL Ltd.). The thickness of the niobium solid solution layer was confirmed by TEM-EDS analysis.

[Evaluation of Battery Characteristics]

The battery characteristics (initial discharge capacity and initial charge and discharge efficiency) were evaluated using the test battery-SBA shown in FIG. 5.

(Configuration of Test Battery)

As shown in FIG. 5, the test battery-SBA includes a case having a negative electrode can NC and a positive electrode can PC, and a green compact cell C housed in the case.

The case includes the hollow negative electrode can NC having one open end, and the positive electrode can PC disposed in the opening of the negative electrode can NC. A space for housing the green compact cell C is formed between the positive electrode can PC and the negative electrode can NC. The positive electrode can PC is fixed to the negative electrode can NC with, for example, a thumb-screw SW. The negative electrode can NC includes a negative electrode terminal, and the positive electrode can PC includes a positive electrode terminal. The case has an insulating sleeve ISV. The negative electrode can NC and the positive electrode can PC are fixed by the insulating sleeve ISV so as to maintain a non-contract state.

A pressure screw PSW is provided at one closed end of the negative electrode can NC. After the positive electrode can PC is fixed to the negative electrode can NC, the pressure screw PSW is tightened toward the housing space of the green compact cell C, thereby holding the green compact cell C in a pressurized state through a hemispherical washer W. A screw-type plug P is provided at one end of the negative electrode can NC where the pressure screw PSW is present. O-rings OL are provided between the negative electrode can NC and the positive electrode can PC, and between the negative electrode can NC and the plug P. The O-rings seal a gap between the negative electrode can NC and the positive electrode can PC, and maintain airtightness in the case.

The green compact cell C is a pellet including a positive electrode layer PL, a solid electrolyte layer SEL, and a negative electrode layer NL laminated in this order. The positive electrode layer PL is in contact with the inner surface of the positive electrode can PC via a lower current collector LCC. The negative electrode layer NL is in contact with the inner surface of the negative electrode can NC via an upper current collector UCC, the washer W, and the pressure screw PSW. The lower current collector LCC, the green compact cell C, and the upper current collector UCC are protected by sleeves SV so that the positive electrode layer PL and the negative electrode layer NL are not in electrical contact with each other.

Production of Evaluation Battery)

A test battery was produced as follows.

First, 80 mg of a synthesized solid electrolyte was pressurized at 25 MPa by a pelleting machine to obtain a solid electrolyte pellet. Then, 70 mg of a positive electrode active material and 30 mg of a solid electrolyte were mixed in a mortar. The solid electrolyte pellet and 15 mg of a mixture of the positive electrode active material and the solid electrolyte were set in a pelleting machine, and pressurized at 360 MPa to form a positive electrode layer PL on the solid electrolyte pellet. A lower current collector LCC, the pellet with the positive electrode layer PL disposed downward, an indium (In) foil (negative electrode layer NL), and an upper current collector UCC were stacked in this order from the bottom, and pressurized at 9 kN to form an electrode (green compact cell C). The electrode (green compact cell C) was sealed in a case, and a pressure screw was tightened at a torque of 6 to 7 N.m. The test battery was produced in a glove box in an Ar atmosphere with a dew point controlled at −80° C.

(Initial Discharge Capacity)

The initial discharge capacity was evaluated by measuring a discharge capacity (initial discharge capacity) when a test battery using an indium foil as a negative electrode was produced, left standing for about 24 hours, charged (initial weight capacity) to a cutoff voltage of 3.7 V (vs. Li—In) with a current density of 0.2 mA/cm$^2$ with respect to a positive electrode after an open circuit voltage (OCV) was stabilized, and discharged to a cutoff voltage of 1.9 V (vs. Li—In) after a pause of 1 hour. The measurement result was 128.1 mAh/g.

(Initial Charge and Discharge Efficiency)

The ratio between the initial charge and discharge capacity and the initial discharge capacity (=initial discharge capacity/initial charge and discharge capacity×100 (%)) obtained in the measurement of the initial discharge capacity was calculated as initial charge and discharge efficiency.

Example 1

(Production of Positive Electrode Active Material)

A powder of a hydroxide containing Ni as a main component and lithium hydroxide were mixed and then fired to obtain a powder of a lithium-metal composite oxide. The obtained lithium-metal composite oxide was represented by $Li_{1.025} Ni_{0.82}Co_{0.15}Al_{0.03}O_2$, and had a volume average particle diameter MV of 12.8 μm and a variation index [(d90−d10)/volume average particle diameter MV] of 0.86. The obtained lithium-metal composite oxide was used as a base material.

A powder of a lithium-metal composite oxide (base material) was coated with a solution obtained by mixing an aqueous lithium hydroxide solution niobium oxide sol (BI-RAL Nb-G6000, manufactured by Taki Chemical Co., Ltd.). The amount of the coating liquid attached was 1.0 mol % in terms of niobium in the niobium oxide sol and 1.0 mol % in terms of lithium in the coating liquid, based on the total (total of metal elements other than Li) of Ni, Co, and Al contained in the powder of the lithium-metal composite oxide.

The coating liquid was attached by spraying the coating liquid onto 500 g of the lithium-metal composite oxide using a tumbling fluidized bed coating apparatus (MP-01, Powrex Corp.). Specifically, 500 g of the lithium-metal composite oxide was caused to flow into the chamber with air heated to 120° C. and having a flow rate of 0.3 m³/h, and the coating liquid was sprayed to the lithium-metal composite oxide at 1 ml/min.

After spraying the entire amount of the coating liquid, the lithium-metal composite oxide was collected from the inside of the chamber, and then fired at 300° C. for 5 hours in the flow of oxygen using an atmosphere firing furnace (BM-50100M, manufactured by Siliconit). Thereafter, the fired product was cooled to room temperature to obtain lithium-metal composite oxide particles (positive electrode active material) having a coating layer as a positive electrode active material. The production conditions and evaluation results of the positive electrode active material thus obtained are shown in Table 1.

Figure 4:
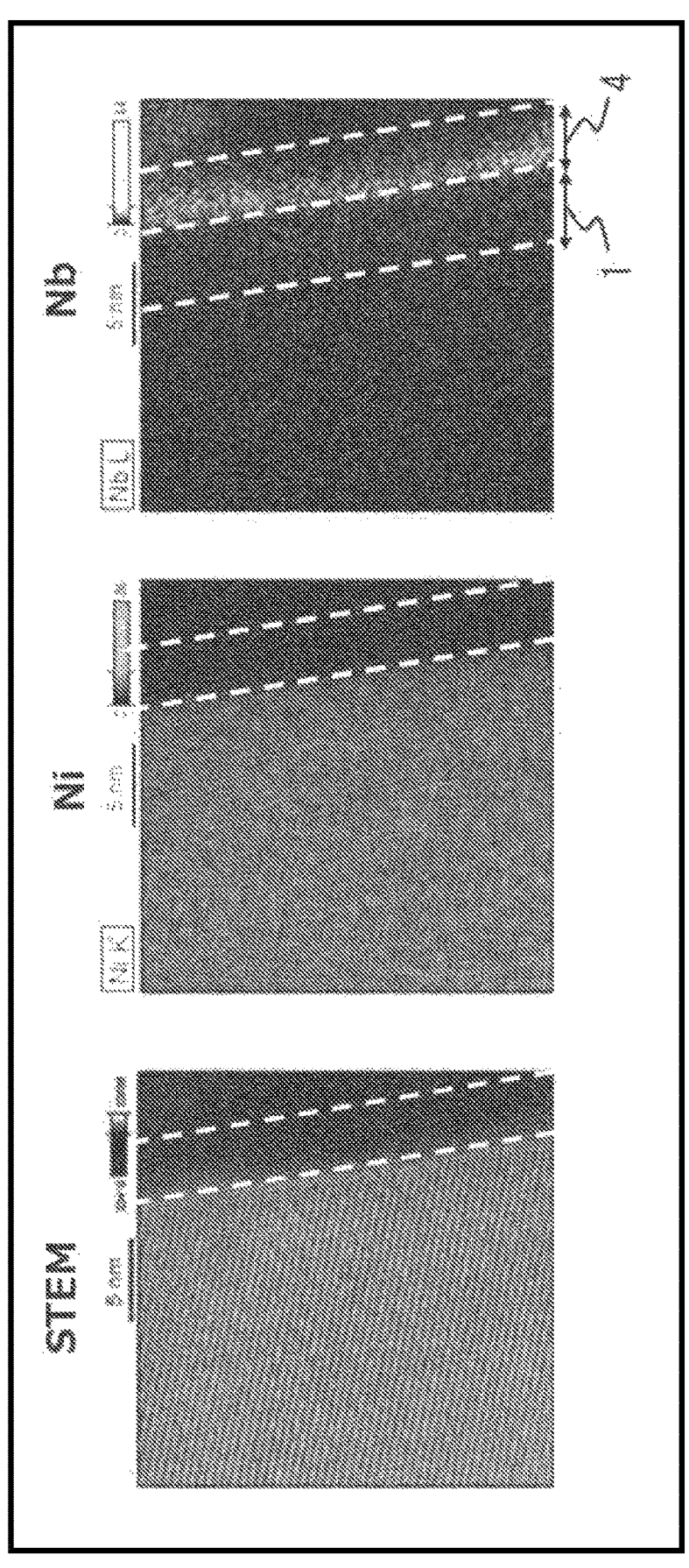
FIG. 4 is a photograph showing the results of STEM-EDS surface analysis of the positive electrode active material of Example 1.

FIG. 4 is the result of STEM-EDS surface analysis of the positive electrode active material of Example 1. FIG. 4 is a photograph showing an STEM image, the distribution of Ni by STEM-EDS, and the distribution of Nb by STEM-EDS from the left. As shown in FIG. 4, Nb exists as a surface layer (a portion corresponding to the distribution of Ni

Example 3

A positive electrode active material was obtained and evaluated in the same manner as in Example 1 except that a niobium oxide sol was mixed with a powder of a lithium-metal composite oxide (base material) in an amount of 1.0 mol % in terms of niobium, and an aqueous lithium hydroxide solution was not mixed with the niobium oxide sol. The production conditions and evaluation results of the positive electrode active material thus obtained are shown in Table 1.

Comparative Example 1

A positive electrode active material was obtained and evaluated in the same manner as in Example 1 except that a niobium oxide sol was not mixed with a powder of a lithium-metal composite oxide (base material). The production conditions and evaluation results of the positive electrode active material thus obtained are shown in Table 1.

TABLE 1

| | Raw materials | | | | | | | | Positive electrode active material | | | | | Battery characteristics | |
| | Lithium-metal composite oxide (base material) | | | | Niobium com-pound | Lithium Com- | Heat treat- | Thickness of niobium solid solution layer | | Thickness of coating layer | | Niobium | Initial dis-charge | Initial charge and discharge |
| | Ni | | Co | Mn | M (Al) | | | | | | | | | | |
| | Li s | (1 − x − y − z) | x | y | z | Type — | pound — | ment ° C. | Range nm | Average nm | Range nm | Average nm | Content mol % | capacity mAh/g | efficiency % |
|---|---|---|---|---|---|---|---|---|---|---|---|---|---|---|---|
| Example 1 | 1.025 | 0.82 | 0.15 | 0.00 | 0.03 | Niobium oxide sol | LiOH | 300 | 1 to 3 | 2 | 7 to 10 | 10 | 1.0 | 128.1 | 69 |
| Example 2 | 1.025 | 0.82 | 0.15 | 0.00 | 0.03 | Niobium oxide sol | LiOH | 300 | 0 to 3 | 1 | 3 to 7 | 5 | 0.5 | 128.3 | 68 |
| Example 3 | 1.025 | 0.82 | 0.15 | 0.00 | 0.03 | Niobium oxide sol | — | 300 | 1 to 3 | 1 | 7 to 15 | 10 | 1.0 | 113.3 | 65 |
| Comparative Example 1 | 1.025 | 0.82 | 0.15 | 0.00 | 0.03 | — | — | — | 0 | 0 | 0 | 0 | 0.0 | 108.5 | 61 | inside the surface) of the lithium-metal composite oxide particle and exists as a coating layer covering the surface (surface layer).

In addition, when the positive electrode active material obtained in Example 1 was measured by XRD, a clear niobium compound peak was not observed. Therefore, the niobium compound present on the surface (coating layer) of the positive electrode active material is considered to be in an amorphous state.

Example 2

A positive electrode active material was obtained and evaluated in the same manner as in Example 1 except that a solution (coating liquid) obtained by mixing an aqueous lithium hydroxide solution with a niobium oxide sol was mixed with a powder of a lithium-metal composite oxide (base material) in an amount of 1.0 mol % in terms of niobium and in an amount of 0.5 mol % in terms of lithium. The production conditions and evaluation results of the positive electrode active material thus obtained are shown in Table 1.

(Evaluation)

The secondary battery using the positive electrode active material of Examples had a high initial discharge capacity and improved initial charge and discharge efficiency. This is considered to be because the presence of the coating layer and the niobium solid solution layer suppressed side reactions between the lithium-metal composite oxide (positive electrode active material) and the solid electrolyte, thereby suppressing deterioration.

On the other hand, in the positive electrode active material of Comparative Example 1, in which niobium was not added, the capacity maintenance rate was low. In addition, in the positive electrode active material of Example 3, in which lithium was not added in addition to niobium in the attaching process, the capacity maintenance rate was improved as compared with the positive electrode active material of Comparative Example 1, but the capacity maintenance rate was lower as compared with the positive electrode active materials of Examples 1 and 2. In Example 3, it is considered that niobium contained in the coating liquid reacts with excessive lithium in the base material to form a coating layer containing lithium and niobium, and a niobium solid solution layer having a sufficient thickness with respect to the thickness of the coating layer was not formed because the lithium amount was insufficient.

The above results show that the positive electrode active material according to the present embodiment has a high battery capacity and can achieve an improvement in the capacity maintenance rate.

Note that, the technical scope of the present invention is not limited to the aspects described in the above embodiment and the like. One or more of the requirements described in the above embodiment and the like may be omitted. Furthermore, the requirements described in the above embodiment and the like can be combined as appropriate. To the extent permitted by law, all the literatures cited in the above embodiment and the like are incorporated as part of the description of this text. In addition, to the extent permitted by law, the disclosure of Japanese Patent Application No. 2019-235267, which is a Japanese patent application, is incorporated as part of the description of the text.

REFERENCE SIGNS LIST

10 Positive electrode active material
1 Niobium solid solution layer
2 Center
3 Lithium-metal composite oxide particle
4 Coating layer
13 Base material
14 Coating layer precursor
PC Positive electrode can
NC Negative electrode can
ISV Insulating sleeve
C Green compact cell
PL Positive electrode layer
NL Negative electrode layer
SEL Solid electrolyte layer
LCC Lower current collector
UCC Upper current collector
P Plug
PSW Pressure screw
W Washer
OL O-ring
SV Sleeve
SW Screw
N Nut

The invention claimed is:

1. A positive electrode active material for an all-solid-state lithium ion secondary battery comprising:
   a lithium-metal composite oxide particle; and
   a coating layer, wherein
   the lithium-metal composite oxide particle has a niobium solid solution layer in which niobium is solid-solved in at least a part of a surface layer of the lithium-metal composite oxide particle, and a center other than the niobium solid solution layer,
   the coating layer coats at least a part of a surface of the lithium-metal composite oxide particle and is formed of a compound containing lithium and niobium,
   the positive electrode active material contains lithium (Li), nickel (Ni), and optionally cobalt (Co), manganese (Mn), and an element M, and a ratio (molar ratio) of amounts of elements other than niobium in the positive electrode active material is represented by Li:Ni:Co:Mn:M=s:(1−x−y−z): x:y:z where $0 \le x \le 0.35$, $0 \le y \le 0.35$, $0 \le z \le 0.10$, $0.95 \le s \le 1.30$, and M is at least one element selected from the group consisting of V, Mg, Mo, Ti, W, Zr, and Al,
   an average thickness of the coating layer is 2 nm or more and 1 μm or less,
   an average thickness of the niobium solid solution layer is 0.5 nm or more and 20 nm or less,
   the lithium-metal composite oxide particle has a layered crystal structure, and
   the niobium solid solution layer is formed by solid-solving niobium into the layered crystal structure of the lithium-metal composite oxide particle.

2. The positive electrode active material for an all-solid-state lithium ion secondary battery according to claim 1, wherein the compound containing lithium and niobium contains at least lithium niobate.

3. The positive electrode active material for an all-solid-state lithium ion secondary battery according to claim 2, wherein the compound containing lithium and niobium contains at least one of $LiSNbO_4$, $LiNbO_3$, $LiNb_3O_8$, and $Li_8Nb_2O_9$.

4. The positive electrode active material for an all-solid-state lithium ion secondary battery according to claim 1, wherein the compound containing lithium and niobium is amorphous.

5. The positive electrode active material for an all-solid-state lithium ion secondary battery according to claim 1, wherein a content of niobium in the positive electrode active material is 0.2 mol % or more and 2.0 mol % or less based on a total of Ni, Co, Mn, and an element M in the lithium-metal composite oxide particle.

6. The positive electrode active material for an all-solid-state lithium ion secondary battery according to claim 1, wherein the coating layer is formed of lithium niobate, and the niobium solid solution layer is in contact with the coating layer.

* * * * *